(12) United States Patent
Li et al.

(10) Patent No.: US 10,942,939 B2
(45) Date of Patent: Mar. 9, 2021

(54) SYSTEMS AND METHODS FOR UNSUPERVISED STREAMING FEATURE SELECTION IN SOCIAL MEDIA

(71) Applicant: ARIZONA BOARD OF REGENTS ON BEHALF OF ARIZONA STATE UNIVERSITY, Tempe, AZ (US)

(72) Inventors: Jundong Li, Tempe, AZ (US); Xia Hu, Tempe, AZ (US); Jiliang Tang, Tempe, AZ (US); Huan Liu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 1041 days.

(21) Appl. No.: 15/412,955

(22) Filed: Jan. 23, 2017

(65) Prior Publication Data
US 2017/0212943 A1   Jul. 27, 2017

Related U.S. Application Data

(60) Provisional application No. 62/286,242, filed on Jan. 22, 2016.

(51) Int. Cl.
| G06F 17/00 | (2019.01) |
| G06F 7/00 | (2006.01) |
| G06F 16/248 | (2019.01) |
| G06F 16/22 | (2019.01) |
| G06F 16/901 | (2019.01) |
| G06F 16/2455 | (2019.01) |
| G06F 16/2457 | (2019.01) |
| G06F 16/9535 | (2019.01) |

(52) U.S. Cl.
CPC .......... *G06F 16/248* (2019.01); *G06F 16/22* (2019.01); *G06F 16/24568* (2019.01); *G06F 16/24578* (2019.01); *G06F 16/9024* (2019.01); *G06F 16/9535* (2019.01)

(58) Field of Classification Search
USPC ....................................................... 707/728
See application file for complete search history.

(56) References Cited

U.S. PATENT DOCUMENTS

| 6,546,398 B1 * | 4/2003 | Simon | G06F 16/217 707/769 |
| 6,640,227 B1 * | 10/2003 | Andreev | G06K 9/6219 707/737 |
| 6,826,539 B2 * | 11/2004 | Loveland | G06Q 10/06 705/4 |
| 7,480,640 B1 * | 1/2009 | Elad | G06Q 10/10 706/14 |
| 7,920,485 B2 | 4/2011 | Tung | |

(Continued)

OTHER PUBLICATIONS

Tang et al., Unsupervised feature selection for linked social media data, Aug. 2012, KDD '12: Proceedings of the 18th ACM SIGKDD international conference on Knowledge discovery and data mining, pp. 904-912 https://doi.org/10.1145/2339530.2339673 (Year: 2012).*

(Continued)

*Primary Examiner* — Pavan Mamillapalli
(74) *Attorney, Agent, or Firm* — Polsinelli PC

(57) ABSTRACT

Systems and methods for exploiting link information in streaming feature selection, resulting in a novel unsupervised streaming feature selection framework are disclosed.

11 Claims, 14 Drawing Sheets

(56) References Cited

U.S. PATENT DOCUMENTS

| | | | | |
|---|---|---|---|---|
| 9,082,043 | B2* | 7/2015 | Liu | G06K 9/6224 |
| 10,319,209 | B2* | 6/2019 | Carlton-Foss | G08B 6/00 |
| 2005/0114313 | A1* | 5/2005 | Campbell | G06F 16/3347 |
| | | | | 707/999.003 |
| 2012/0311496 | A1 | 12/2012 | Cao et al. | |
| 2013/0073489 | A1 | 3/2013 | Qin et al. | |
| 2014/0072209 | A1 | 3/2014 | Brumby et al. | |
| 2014/0321758 | A1* | 10/2014 | Liu | G06K 9/623 |
| | | | | 382/215 |
| 2015/0324663 | A1 | 11/2015 | Liu et al. | |

OTHER PUBLICATIONS

Airoldi et al, Mixed membership stochastic blockmodel, 2009,. In NIPS, pp. 33-40. (Year: 2009).*
Lior Wolf and Amnon Shashua. Feature selection for unsupervised and supervised inference: The emergence of sparsity in a weight-based approach. The Journal of Machine Learning Research, 6:1855-1887, 2005.
Zheng Zhao, Lei Wang, and Huan Liu. Efficient spectral feature selection with minimum redundancy. In Proceedings of the Twenty-Fourth AAAI Conference on Artificial Intelligence, AAAI 2010, Atlanta, Georgia, USA, Jul. 11-15, 2010, 2010.
Chen, X., & Candan, K. S. (2014). GI-NMF: Group incremental non-negative matrix factorization on data streams. Paper presented at the 1119-1128. doi:10.1145/2661829.2662008.
Unsupervised Streaming Feature Selection in Social Media Jundong Li, Xia Hu, Jiliang Tang, Huan Liu in Proceedings of 24th ACM International Conference on Information and Knowledge Management (CIKM), Melbourne, Australia, Oct. 19-23, 2015.
C. C. Aggarwal, J. Han, J. Wang, and P. S. Yu. A framework for projected clustering of high dimensional data streams. In VLDB, pp. 852{863. VLDB Endowment, 2004.
E. M. Airoldi, D. M. Blei, S. E. Fienberg, and E. P. Xing. Mixed membership stochastic blockmodels. In NIPS, pp. 33{40, 2009.
D. Cai, C. Zhang, and X. He. Unsupervised feature selection for multi-cluster data. In KDD, pp. 333{342. ACM, 2010.
X. Chen and K. S. Candan. Lwi-svd: low-rank, windowed, incremental singular value decompositions on time-evolving data sets. In KDD, pp. 987{996. ACM, 2014.
J. Dem_sar. Statistical comparisons of classi_ers over multiple data sets. The Journal of Machine Learning Research, 7:1{30, 2006.
C. Ding and H. Peng. Minimum redundancy feature selection from microarray gene expression data.Journal of bioinformatics and computational biology, 3(02):185{205, 2005.
J. G. Dy and C. E. Brodley. Feature subset selection and order identi_cation for unsupervised learning. In ICML, pp. 247{254, 2000.
L. Gong, J. Zeng, and S. Zhang. Text stream clustering algorithm based on adaptive feature selection. Expert Systems with Applications, 38(3):1393{1399, 2011.
P. K. Gopalan, S. Gerrish, M. Freedman, D. M. Blei, and D. M. Mimno. Scalable inference of overlapping communities. In NIPS, pp. 2249{2257, 2012
Q. Gu, Z. Li, and J. Han. Generalized_sher score for feature selection. In UAI, pp. 266{273, 2012.
T. Guo, X. Zhu, J. Pei, and C. Zhang. Snoc: streaming network node classi_cation. In ICDM, pp. 150{159. IEEE, 2014.
I. Guyon, J. Weston, S. Barnhill, and V. Vapnik. Gene selection for cancer classi_cation using support vector machines. Machine learning, 46(1-3):389{422, 2002.
X. He, D. Cai, and P. Niyogi. Laplacian score for feature selection. In NIPS, pp. 507{514, 2005.
G. H. John, R. Kohavi, K. Peger, et al. Irrelevant features and the subset selection problem. In ICML, 1994.
Z. Li, Y. Yang, J. Liu, X. Zhou, and H. Lu. Unsupervised feature selection using nonnegative spectral analysis. In AAAI, pp. 1026{1032, 2012.

H. Liu, E.-P. Lim, H. W. Lauw, M.-T. Le, A. Sun, J. Srivastava, and Y. Kim. Predicting trusts among users of online communities: an epinions case study. In EC, pp. 310{319. ACM, 2008.
M. McPherson, L. Smith-Lovin, and J. M. Cook. Birds of a feather: Homophily in social networks. Annual Review of Sociology, pp. 415{444, 2001.
M. E. Newman and M. Girvan. Finding and evaluating community structure in networks. Physical review E, 69(2):026113, 2004.
F. Nie, H. Huang, X. Cai, and C. H. Ding. E_cient and robust feature selection via joint l2, 1-norms minimization. In NIPS, pp. 1813{1821, 2010.
F. Nie, S. Xiang, Y. Jia, C. Zhang, and S. Yan. Trace ratio criterion for feature selection. In AAAI, pp. 671{676, 2008.
H. Peng, F. Long, and C. Ding. Feature selection based on mutual information criteria of max-dependency, max-relevance, and min-redundancy. IEEE Transactions on Pattern Analysis and Machine Intelligence, 27(8):1226{1238, 2005.
S. Perkins, K. Lacker, and J. Theiler. Grafting: Fast, incremental feature selection by gradient descent in function space. The Journal of Machine Learning Research, 3:1333{1356, 2003.
S. Perkins and J. Theiler. Online feature selection using grafting. In ICML, pp. 592{599, 2003.
M. Robnik-_Sikonja and I. Kononenko. Theoretical and empirical analysis of relie_ and rrelie_. Machine Learning, 53(1-2):23{69, 2003.
J. Tang and H. Liu. Unsupervised feature selection for linked social media data. In KDD, pp. 904{912. ACM, 2012.
L. Tang and H. Liu. Relational learning via latent social dimensions. In KDD, pp. 817{826. ACM, 2009.
R. Tibshirani. Regression shrinkage and selection via the lasso. Journal of the Royal Statistical Society: Series B, pp. 267{288, 1996.
J. Wang, Z.-Q. Zhao, X. Hu, Y.-M. Cheung, M. Wang, and X. Wu. Online group feature selection. In IJCAI, pp. 1757{1763. AAAI Press, 2013.
X. Wu, K. Yu, H. Wang, and W. Ding. Online streaming feature selection. In ICML, pp. 1159{1166, 2010.
W. Yang, H. Xu, and A. Theorem. Streaming sparse principal component analysis. In ICML, pp. 494{503, 2015.
Y. Yang, H. T. Shen, Z. Ma, Z. Huang, and X. Zhou. l2, 1-norm regularized discriminative feature selection for unsupervised learning. In IJCAI, pp. 1589{1594, 2011.
Z. Zhao and H. Liu. Spectral feature selection for supervised and unsupervised learning. In ICML, pp. 1151{1157. ACM, 2007.
J. Zhou, D. Foster, R. Stine, and L. Ungar. Streaming feature selection using alpha-investing. In KDD, pp. 384{393. ACM, 2005.
H. Zou and T. Hastie. Regularization and variable selection via the elastic net. Journal of the Royal Statistical Society: Series B, 67(2):301{320, 2005.
Wang, D., Nie, F., & Huang, H. (Sep. 2014). Unsupervised feature selection via unified trace ratio formulation and k-means clustering (TRACK). In Joint European Conference on Machine Learning and Knowledge Discovery in Databases (pp. 306-321). Springer Berlin Heidelberg.
Du, L., & Shen, Y. D. (Aug. 2015). Unsupervised feature selection with adaptive structure learning.
Jiliang Tang and Huan Liu. "Feature Selection for Social Media Data", ACM Transactions on Knowledge Discovery from Data (TKDD),8(4) pp. 19:1-19:27, 2014.
Jiliang Tang, Xia Hu, Huiji Gao, and Huan Liu. "Discriminant Analysis for Unsupervised Feature Selection", the 14th SIAM International Conference on Data Mining (SDM), 2014.
Wang, S., Tang, J., & Liu, H. (Jan. 2015). Embedded Unsupervised Feature Selection. In AAAI (pp. 470-476).
Christos Boutsidis, Petros Drineas, and Michael W Mahoney. Unsupervised feature selection for the k-means clustering problem. In Advances in Neural Information Processing Systems, pp. 153-161, 2009.
Stephen Boyd, Neal Parikh, Eric Chu, Borja Peleato, and Jonathan Eckstein. Distributed optimization and statistical learning via the alternating direction method of multipliers. Foundations and TrendsR in Machine Learning, 3(1):1-122, 2011.

(56) References Cited

OTHER PUBLICATIONS

Tom Goldstein, Brendan ODonoghue, and Simon Setzer. Fast alternating direction optimization methods. CAM report, pp. 12-35, 2012.

Quanquan Gu and Jiawei Han. Towards feature selection in network. In Proceedings of the 20th ACM international conference on Information and knowledge management, pp. 1175-1184. ACM, 2011.

Isabelle Guyon and Andr'e Elisseeff. An introduction to variable and feature selection. The Journal of Machine Learning Research, 3:1157-1182, 2003.

Jin Huang, Feiping Nie, Heng Huang, and Chris Ding. Robust manifold nonnegative matrix factorization. ACM Transactions on Knowledge Discovery from Data (TKDD), 8(3):11, 2014.

Jun Liu, Shuiwang Ji, and Jieping Ye. Multi-task feature learning via efficient l 2, 1-norm minimization. In Proceedings of the Twenty-Fifth Conference on Uncertainty in Artificial Intelligence, pp. 339-348. AUAI Press, 2009.

Mingjie Qian and Chengxiang Zhai. Robust unsupervised feature selection. In Proceedings of the Twenty-Third joint international conference on Artificial Intelligence, pp. 1621-1627. AAAI Press, 2013.

Peter H Schonemann. A generalized solution of the orthogonal procrustes problem. Psychometrika, 31(1):1-10, 1966.

Dinesh Singh, Phillip G Febbo, Kenneth Ross, Donald G Jackson, Judith Manola, Christine Ladd, Pablo Tamayo, Andrew A Renshaw, Anthony V D'Amico, Jerome P Richie, et al. Gene expression correlates of clinical prostate cancer behavior. Cancer cell, 1(2):203-209,2002.

Alelyani et al., Feature selection for clustering: A review. In Data Clustering: Algorithms and Applications, pp. 29-60. CRC Press, 2013.

Boyd et al., Convex optimization. Cambridge university press, 2004.

Duda et al., Pattern classification. 2nd. Edition. New York, 2001.

Fodor, DNA sequencing: Massively parallel genomics. 277(5324):393-395, 1997.

Jain et al., Feature selection: Evaluation, application, and small sample performance, 1997.

Liu et al., Computational methods of feature selection. CRC Press, 2007.

Nene et al., Columbia object image library (coil-20). Technical report, Technical Report CUCS-005-96, 1996.

Tang et al., Feature selection for classification: A review. In Data Classification: Algorithms and Applications. 2014.

Tang et al., Feature selection with linked data in social media. In Proceedings of the Twelfth SIAM International Conference on Data Mining, Anaheim, California, USA, Apr. 26-28, 2012., pp. 118-128, 2012.

Von Luxburg, A tutorial on spectral clustering. Statistics and computing, 17(4):395-416, 2007.

\* cited by examiner

204

SYSTEMS AND METHODS FOR UNSUPERVISED STREAMING FEATURE SELECTION IN SOCIAL MEDIA

CROSS REFERENCE TO RELATED APPLICATIONS

This is a non-provisional application that claims benefit to U.S. provisional application Ser. No. 62/286,242 filed on Jan. 22, 2016, which is herein incorporated by reference in its entirety.

GOVERNMENT SUPPORT

The presently disclosed technology was made with government support under contract no. 1217466 awarded by the National Science Foundation. The government has certain rights in the presently disclosed technology.

FIELD

The present disclosure generally relates to feature selection and in particular to systems and methods for unsupervised feature selection in social media.

BACKGROUND

The rapid growth and popularity of social media services such as Twitter and Facebook provide a platform for people to perform online social activities by sharing information and communicating with others. Massive amounts of high-dimensional data (blogs, posts, images, etc.) are user generated and quickly disseminated. It is desirable and of great importance to reduce the dimensionality of social media data for many learning tasks due to the curse of dimensionality. One way to resolve this problem is feature selection, which aims to select a subset of relevant features for a compact and accurate representation.

Traditional feature selection assumes that all features are static and known in advance. However, this assumption is invalid in many real-world applications especially in social media which is imbued with high-velocity streaming features. In social media, features are generated dynamically, new features are sequentially added and the size of features is unknown in most cases. For example, Twitter produces more than 320 million tweets every day and a large amount of slang words (features) are continuously being user generated. These slang words promptly grab users' attention and become popular in a short time. It is not practical to wait until all features are available before performing feature selection. Another example is that after earthquakes, topics (features) like "Nepal" emerge as hot topics in social media shortly afterwards, thus traditional batch-mode feature selection can hardly capture and select such features in a timely manner. Therefore, it could be more appealing to perform streaming feature selection (SFS) to rapidly adapt to the changes.

In SFS, the number of instances is considered to be constant while candidate features arrive one at a time. The task is to timely select a subset of relevant features from all features seen so far. Instead of searching for the whole feature space which is costly, SFS processes a new feature upon its arrival. A general framework of streaming feature selection is presented in FIG. 1. At each time step, a typical SFS algorithm first determines whether to accept the most recently arrived feature. If the feature is added to the selected feature set, it then determines whether to discard some existing features from the selected feature set. The process repeats until no new features show up anymore. The vast majority of existing streaming feature selection algorithms is supervised which utilize label information to guide feature selection process. However, in social media, it is easy to a mass vast quantities of unlabeled data, while it is time and labor consuming to obtain labels. To deal with large-scale unlabeled data in social media, unsupervised streaming feature selection is desirable. However, unsupervised streaming feature selection is particularly difficult and challenging because: (1) without any label information, it is difficult to assess the importance of features; and (2) features are usually not predefined, but are generated dynamically, hence it cannot be carried out by directly applying traditional unsupervised feature selection algorithms.

On the other hand, link information is abundant in social media. As observed by homophily from social sciences, linked instances are likely to share similar features (or attributes). Therefore, as label information for supervised streaming feature selection, link information could provide helpful constraints to enable unsupervised streaming feature selection. However, linked social media data is inherently not independent and identically distributed (i.i.d.), while existing streaming feature selection are based on the data i.i.d assumption, it is challenging to exploit link information for streaming feature selection. It is with these observations in mind, among others, that various aspects of the present disclosure were conceived and developed.

BRIEF DESCRIPTION OF THE DRAWINGS

FIG. 3A is a graph showing the cumulative runtime on BlogCatalog dataset, while

Corresponding reference characters indicate corresponding elements among the view of the drawings. The headings used in the figures do not limit the scope of the claims.

DETAILED DESCRIPTION

Aspects of the present disclosure involve systems and methods for unsupervised feature selection in social media using an unsupervised streaming feature selection framework ("USFS framework 100"). In one aspect, the systems and methods described herein link exploit link information for feature selection and perform streaming feature selection in unsupervised scenarios. The presently disclosed technology utilizes link information to enable unsupervised streaming feature selection in social media. Further, an unsupervised streaming feature selection framework, which exploits link and feature information simultaneously to select features dynamically and efficiently. An empirical demonstration of the efficacy and efficiency of the USFS framework 100 on real-world social media datasets is provided herein.

Figure 1:
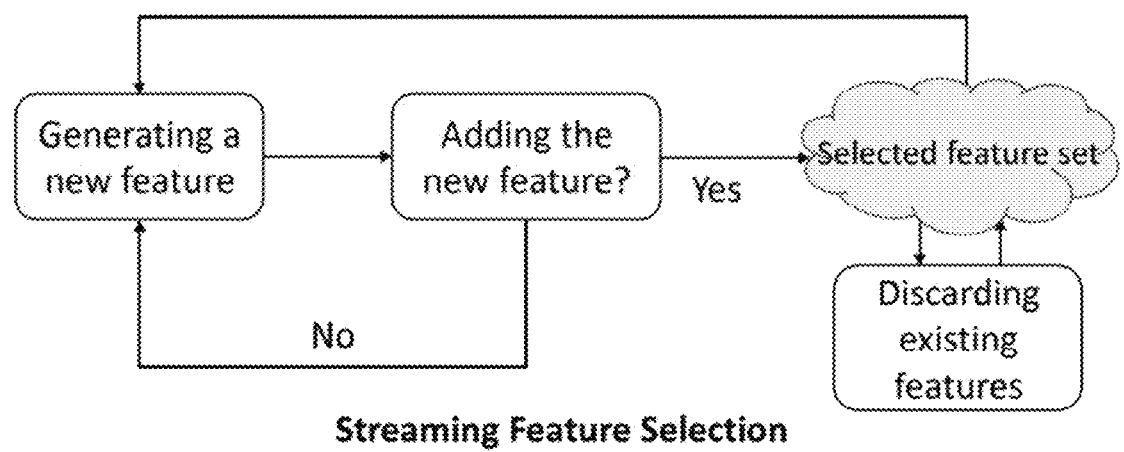
FIG. 1 is a simplified illustration showing a framework for a streaming feature selection consisting to two phases.
Figure 2:
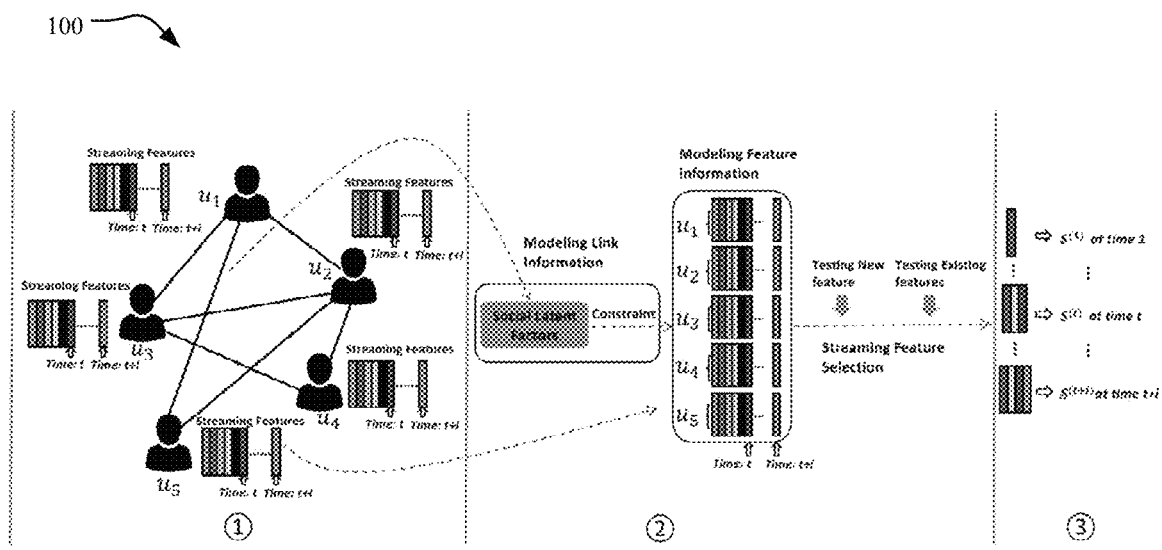
FIG. 2 is a simplified illustration showing a framework of unsupervised streaming feature selection in social media.

To begin a detailed description of an example USFS framework 100, reference is made to FIG. 2. In one implementation, the framework 100 generates a data matrix for high-dimensional data. The data matrix has a plurality of data instances and link information denoted between the plurality of data instances, and each of the data instances are associated with a set of one or more features that are dynamically generated and arrive at a time step from a social media stream. The framework 100 extracts social latent factors for each of the plurality of data instances from the link information and selecting one or more relevant features in the social media stream from the one or more features through a regression model using the social latent factors as a constraint during unsupervised streaming feature selection.

In this disclosure, bold uppercase characters denote matrices, bold lowercase characters denote vectors, normal lowercase characters denote scalars. For an arbitrary matrix $A \in \mathbb{R}^{n \times d}$, $a_i$ and $a^j$ mean the i-th row and j-th column of matrix A, respectively. $A_{ij}$ or $a^j_i$ denotes the (i, j)-th of matrix A. $A^{(t)}$ denotes the matrix of A at time step t, $(a^{(t)})_i$ and $(a^{(t)})^j$ represent i-th row and j-th column of matrix $A^{(t)}$, respectively. Tr(A) is the trace of matrix A if it is square, the Frobenius norm of the matrix $A \in \mathbb{R}^{n \times d}$ is defined as $$\|A\|_F = \sqrt{\sum_{i=1}^{n} \sum_{j=1}^{d} A_{ij}^2}.$$

Let $\mathcal{U} = \{u_1, u_2, \ldots, u_n\}$ denote a set of n linked data instances. It is assumed features are dynamically generated and one feature arrives at each time step, thus, at time step t, each linked data instance is associated with a set of t features $\mathcal{F}^{(t)} = \{f_1, f_2, \ldots, f_t\}$. Then at the next time step t+1, each linked instance is tied with a new feature set $\mathcal{F}^{(t+1)} = \{f_1, f_2, \ldots, f_t, f_{t+1}\}$. The data representation at time step t and t+1 can be represented as $X^{(t)} = [f_1, f_2, \ldots, f_t]$ and $X^{(t+1)} = [f_1, f_2, \ldots, f_t, f_{t+1}]$, where $f_1, \ldots, f_t, f_{t+1}$ are the feature vectors corresponding to features $f_1, \ldots, f_t, f_{t+1}$. The link information is denoted between instances in a matrix $M \in \mathbb{R}^{n \times n}$, where $M_{ij} = 1$ if $u_i$ and $u_j$ are linked, otherwise $M_{ij} = 0$. The link information can either be a directed or an undirected graph. It should be noted that the dynamics of link information is not considered and the reason is that link information does not change as fast as feature information; for example, the friend circles of most users are often stable once they are established.

With these notations, the task of unsupervised streaming feature selection in social media focuses on finding a subset of most relevant features $S^{(t)} \subseteq \mathcal{F}^{(t)}$ at each time step t to facilitate clustering by utilizing both the feature information $\mathcal{F}^{(t)}$ and the link information M.

Unsupervised Streaming Feature Selection in Social Media

The work flow of the USFS framework 100 is shown in FIG. 2. It can be observed that it consists of three components. The first component shows the representation of data. There is a set of linked instances (for example) $u_1$, $u_2$, ..., $u_5$); for each linked instance, its features arrive through a streaming fashion, for example, $u_1, u_2, \ldots, u_5$ are associated with features $f_1, f_2, \ldots, f_t$ at time step t; are associated with features $f_1, f_2, \ldots, f_{t+i}$ at time step t+i. The second component shows the process of the algorithm. It will be discussed how to model link information via extracting social latent factors and how to use them as a constraint through a regression model. Then it will be discussed how to model feature information to make it consistent with social latent factors. Finally, it will be shown how to efficiently test new feature and existing features discussed herein. After that, as shown in the third component, a subset of relevant features will be obtained at each time step (for example, $S^{(t)}$ at time step t).

Modeling Link Information

Social media users connect to each other due to different factors such as movie fans, football enthusiasts, colleagues and each factor should be related to certain features (or attributes) of users. Therefore, extracting these factors from link information should be very useful to steer the unsupervised streaming feature selection. However, in most cases, these hidden factors are not explicitly available in social media data.

Uncovering hidden social factors has been extensively studied. In this disclosure, the social latent factors will be extracted for each instance based on the mixed membership stochastic blockmodel. In the blockmodel, it is assumed that there exists a number of latent factors, and these latent factors interact with each other with certain probabilities to form social relationships. More specially, each instance is associated with a k-dimensional latent factor vector $\pi_i \in \mathbb{R}^k$ where $\pi_{ig}$ denotes the probability of $u_i$ in factor g. This means that each instance can simultaneously be sided with multiple latent factors with different affiliation strength. For each instance, the indicator vector $z_{i \rightarrow j}$ denotes the latent factor membership of $u_i$ when it links to $u_j$ and $z_{i \leftarrow j}$ denotes the latent factor membership of $u_i$ when it is linked from $u_j$. The interaction strength between different latent factors is encoded in a k×k stochastic matrix B, in which each element is between 0 and 1. Then the observed link information is generated according to the following process:

For each linked instance $u_i$,
Draw a k dimensional vector $\pi_i \sim \text{Dirichlet}(\theta)$.
For each pair of linked instance $(i, j) \in \mathcal{U} \times \mathcal{U}$,
Draw indicator vector $z_{i \rightarrow j} \sim \text{Multinomial}(\pi_i)$.
Draw indicator vector $z_{i \leftarrow j} \sim \text{Multinomial}(\pi_j)$.
Draw the relationship between $u_i$ and $u_j$, $M_{i,j} \sim \text{Bernoulli}(z_{i \rightarrow j} B z_{i \leftarrow j})$.

A scalable inference algorithm is used to obtain the social latent factors $\Pi = [\pi_1, \pi_2, \ldots, \pi_n]^T \in \mathbb{R}^{n \times k}$ for all n instances efficiently.

As the social latent factors are obtained for each linked instances, the framework takes advantage of them as a constraint to perform feature selection through a regression model. The importance of each feature is measured by its ability to differentiate different social latent factors. At time step t, given each social latent factor $\pi^i$ (a column of $\Pi$) for all instances, a subset is found of most relevant features by the following minimization problem:

$$\min_{w^{(t)}} \mathcal{J}(W^{(t)}) = \frac{1}{2} \sum_{i=1}^{k} \|X^{(t)}(w^{(t)})^i - \pi^i\|_2^2 + \alpha \sum_{i=1}^{k} \|(w^{(t)})^i\|_1 \quad (1)$$

$$= \frac{1}{2} \|X^{(t)} W^{(t)} - \Pi\|_F^2 + \alpha \sum_{i=1}^{k} \|(w^{(t)})^i\|_1,$$

where $X^{(t)} \in \mathbb{R}^{n \times t}$, $W^{(t)} \in \mathbb{R}^{t \times k}$ is a mapping matrix which assigns each instance a k-dimensional social latent vector at time step t. Each column of $W^{(t)}$, i.e., $(w^{(t)})^i \in \mathbb{R}^t$ contains coefficients of t different features in approximating the i-th social latent vector of $\Pi$. $\alpha$ is a parameter which controls the trade-off between the loss function and the $l_1$-norm. One main advantage of $l_1$-norm regression is that it leads some coefficients of $(w^{(t)})^i$ to be exact zero. This property makes it to be suitable for feature selection, as features can be selected with corresponding non-zero coefficients.

It is known that the number of selected features is usually bounded by the number of data instances, which is unrealistic in many applications. Besides, features in social media usually have strong pairwise correlations, such as synonyms or antonyms words in text data. It is known to randomly select features from a group and discards the others. Therefore, we employ the elastic net on the basis of Equation (1):

$$\min_{w^{(t)}} \mathcal{J}(W^{(t)}) = \frac{1}{2}\|X^{(t)}W^{(t)} - \Pi\|_F^2 + \alpha\sum_{i=1}^{k}\|(w^{(t)})^i\|_1 + \frac{\beta}{2}\|W^{(t)}\|_F^2, \quad (2)$$

where the regularization term $$\frac{\beta}{2}\|W^{(t)}\|_F^2$$

controls the robustness of the learned model.

Modeling Feature Information

In Twitter, if two users post similar contents (features), they are more likely to share similar social latent factors, like hobbies, education background, etc. The similarity of social latent factors reflects the correlation of two linked instances in the feature space. In other words, social latent factors of two instances are more likely to be consistent when their feature similarity (like textual similarity) is high. To model the feature information, a graph g is constructed to represent the feature similarity between different data instances. The adjacency matrix $A \in \mathbb{R}^{n \times n}$ of the graph g at time step t is defined as:

$$A_{ij}^{(t)} = \begin{cases} 1 & \text{if } (x^{(t)})_i \in \mathcal{N}_p((x^{(t)})_j) \text{ or } (x^{(t)})_j \in \mathcal{N}_p((x^{(t)})_i) \\ 0 & \text{otherwise} \end{cases}$$

where $(x^{(t)})_i$ indicates the feature information of $u_i$, $\mathcal{N}_p((x^{(t)})_i)$ represents p-nearest neighbors of $(x^{(t)})_i$. Then feature information can be modeled by minimizing the following term:

$$\frac{1}{2}\sum_{i=1}^{n}\sum_{j=1}^{n} A_{ij}^{(t)}\|(X^{(t)}W^{(t)})_i - (X^{(t)}W^{(t)})_j\|_2^2 \quad (3)$$

$$= Tr\big((X^{(t)}W^{(t)})^T(D^{(t)} - A^{(t)})(X^{(t)}W^{(t)})\big)$$

$$= Tr\big((X^{(t)}W^{(t)})^T L^{(t)}(X^{(t)}W^{(t)})\big),$$

where $D^{(t)} \in \mathbb{R}^{n \times n}$ is a diagonal matrix with $D_{ii}^{(t)} = \sum_{j=1}^{n} A_{ij}^{(t)}$, $L^{(t)} = D^{(t)} - A^{(t)}$ is the Laplacian matrix. Since the Laplacian matrix in Equation (3) is positive-semi-definite, Equation (3) can also be written as:

$$Tr\big((X^{(t)}W^{(t)})^T L^{(t)}(X^{(t)}W^{(t)})\big) = \left\|(X^{(t)}W^{(t)})^T (L^{(t)})^{\frac{1}{2}}\right\|_F^2. \quad (4)$$

The optimization formulation, which integrates feature information, is defined as:

$$\min_{w^{(t)}} \mathcal{J}(W^{(t)}) = \frac{1}{2}\|X^{(t)}W^{(t)} - \Pi\|_F^2 + \quad (5)$$

$$\alpha\sum_{i=1}^{k}\|(w^{(t)})^i\|_1 + \frac{\beta}{2}\|W^{(t)}\|_F^2 + \frac{\gamma}{2}\left\|(X^{(t)}W^{(t)})^T (L^{(t)})^{\frac{1}{2}}\right\|_F^2,$$

where γ is the regularization parameter to balance link information and feature information.

Streaming Feature Selection Framework

The objective function in Equation (5) at time step t is parameterized by a transformation matrix $W^{(t)}$. It can be further decomposed into a series of k sub-problems which correspond to k social latent factors:

$$\min_{(w^{(t)})^i} \mathcal{J}((w^{(t)})^i) = \frac{1}{2}\|X^{(t)}(w^{(t)})^i - \pi^i\|_2^2 + \quad (6)$$

$$\alpha\|(w^{(t)})^i\|_1 + \frac{\beta}{2}\|(w^{(t)})^i\|_2^2 + \frac{\gamma}{2}\left\|(X^{(t)}(w^{(t)})^i)^T (L^{(t)})^{\frac{1}{2}}\right\|_2^2,$$

where i=1, . . . , k. By solving each sub-problem in Equation (6), a subset of features can be selected at time t. Next it is introduced how to efficiently perform feature selection when a new feature $f_{t+1}$ is generated at a new time step t+1. Following common steps of supervised streaming feature selection, the USFS framework 100 will test: (1) whether the new feature should be selected; and (2) whether some existing features should be discarded.

Testing New Features

It can be observed from Equation (6) that at time step t+1, incorporating a new feature feature $f_{t+1}$ involves adding a new non-zero weight value $(w^{(t+1)})_{t+1}^i$ to the model, which incurs a penalty increasing $\alpha\|(w^{(t+1)})_{t+1}^i\|_1$ on the $l_1$ regularization term. The addition of the new feature $f_{t+1}$ reduces the overall objective function value in Equation (6) only when the overall reduction from the first, third, and forth term outweighs the increase of $l_1$ penalty $\alpha\|(w^{(t)})_{t+1}^i\|_1$.

A stagewise is adopted as a way to check newly arrived features. Let $\mathcal{J}((w^{(t+1)})^i)$ denotes the objective function of Equation (6) at time step t+1:

$$\min_{(w^{(t+1)})^i} \mathcal{J}((w^{(t+1)})^i) = \frac{1}{2}\|X^{(t+1)}(w^{(t+1)})^i - \pi^i\|_2^2 + \quad (7)$$

$$\alpha\|(w^{(t+1)})^i\|_1 + \frac{\beta}{2}\|(w^{(t+1)})^i\|_2^2 + \frac{\gamma}{2}\left\|(X^{(t+1)}(w^{(t+1)})^i)^T (L^{(t+1)})^{\frac{1}{2}}\right\|_{2_i}^2$$

then the derivative of $\mathcal{J}((w^{(t+1)})^i)$ with respect to $(w^{(t+1)})_{t+1}^i$ is as follows:

$$\frac{\partial \mathcal{J}((w^{(t+1)})^i)}{\partial (w^{(t+1)})_{t+1}^i} = \big[(X^{(t+1)})^T(X^{(t+1)}(w^{(t+1)})^i - \pi^i) + \beta(w^{(t+1)})^i + \quad (8)$$

$$\gamma(X^{(t+1)})^T L^{(t+1)} X^{(t+1)}(w^{(t+1)})^i\big]_{t+1} + \alpha \, \text{sign}((w^{(t+1)})_{t+1}^i.$$

$$= \big[(X^{(t+1)})^T(X^{(t+1)}(w^{(t+1)})^i - \pi^i) + \beta(w^{(t+1)})^i +$$

$$\gamma(X^{(t+1)})^T L^{(t+1)} X^{(t+1)}(w^{(t+1)})^i\big]_{t+1} \pm \alpha.$$

In Equation (8), the derivative of $l_1$-norm term $\alpha\|(w^{(t+1)})_i\|_1$ w.r.t. $(w^{(t+1)})_{t+1}^i$ is not smooth. Here the sign of the derivative, i.e., $\text{sign}(w^{(t+1)})_{t+1}^i$ is discussed. When the new feature $f_{t+1}$ arrives, its feature coefficient $(w^{(t+1)})_{t+1}^i$ is first set to be zero and add it to the model, if:

$$\big[(X^{(t+1)})^T(X^{(t+1)}(w^{(t+1)})^i - \pi^i) + \beta(w^{(t+1)})^i + \gamma(X^{(t+1)})^T L^{(t+1)}$$
$$X^{(t+1)}(w^{(t+1)})^i\big]_{t+1} - \alpha > 0, \quad (9)$$

it is easy to verify that:

$$\frac{\partial \mathcal{J}((w^{(t+1)})^i)}{\partial (w^{(t+1)})_{t+1}^i} > 0. \qquad (10)$$

In order to reduce the objective function value $\mathcal{J}$ $((w^{(t+1)})^i)$, the value of $(w^{(t+1)})_{t+1}^i$ is required to be slightly reduced to make it negative, and then the sign of $(w^{(t+1)})_{t+1}^i$ will be negative. For the same reason, if:

$$[(X^{(t+1)})^T(X^{(t+1)}(w^{(t+1)})^i - \pi^i) + \beta(w^{(t+1)})^i + \gamma(X^{(t+1)})^T L^{(t+1)} \\ X^{(t+1)}(w^{(t+1)})^i]_{t+1} + \alpha > 0, \qquad (11)$$

then:

$$\frac{\partial \mathcal{J}((w^{(t+1)})^i)}{\partial (w^{(t+1)})_{t+1}^i} < 0, \qquad (12)$$

the sign of $(w^{(t+1)})_{t+1}^i$ will be positive. If both of previous conditions are not satisfied, it is impossible to reduce the objective function value $\mathcal{J}((w^{(t+1)})^i)$ by making $(w^{(t+1)})_{t+1}^i$ as a small disturbance around 0. In other words, for the new feature $f_{t+1}$, we need to check:

$$|[(X^{(t+1)})^T(X^{(t+1)}(w^{(t+1)})^i - \pi^i) + \beta(w^{(t+1)})^i + \gamma(X^{(t+1)})^T L^{(t+1)} \\ X^{(t+1)}(w^{(t+1)})^i]_{t+1}| > \alpha. \qquad (13)$$

As the condition in Equation (13) is satisfied, it indicates that the addition of the new feature $f_{t+1}$ will reduce the objective function value $\mathcal{J}((w^{(t+1)})^i)$, therefore the new feature is included in the model described in Equation (7).

Testing Existing Features

In social media, when new features are continuously being generated, they may take place of some existing features since new features can better reflect the interests of users, etc. Old features become outdated as a result, therefore, in the unsupervised streaming feature selection framework 100, it is investigated if it is necessary to remove any existing selected features.

After a new feature is accepted and added to the model, Equation (7) is optimized with respect to existing feature weights, such that the optimization may force some feature weights to be zero. If the feature weight obtains a zero value, it indicates that the existence of the feature is not likely to reduce the objective function value and the feature can be removed. Here it is discussed how to solve the optimization problem in Equation (7). The objective function in Equation (7) is convex and the gradient with respect to $(w^{(t+1)})_{t+1}^i$ can be easily obtained as Equation (8), then a global optimum solution can be achieved. A Broyden-Fletcher-Goldfarb-Shanno (BFGS) quasi-newton method is used to solve the optimization problem. Unlike traditional Newton's method, which requires the calculation of second derivatives (the Hessian), BFGS only needs the gradient of the objective function to be computed at each iteration. Therefore, it is more efficient than Newton's methods especially when Hessian evaluation is slow.

The minimization problem in Equation (7) can be generalized to the following form:

$$\min f(x), x \in \mathbb{R}^n. \qquad (14)$$

At each iteration, the optimal solution x is updated as:

$$x_{m+1} = x_m - \delta_m H_m g_m, \qquad (15)$$

where $H_m = B_m^{-1}$, $B_m$ is an approximation to the Hessian matric ($B_m \approx [\nabla^2 f(x_m)]$), $g_m = \nabla f(x_m)$ is the gradient and $\delta_m$ is the step size that can be determined by line search. Let the vectors $s_m$ and $c_m$ be:

$$s_m = x_{m+1} - x_m, c_m = g_{+1} - g_m, \qquad (16)$$

the next Hessian approximation has to meet the secant equation:

$$B_{m+1} s_m = c_m. \qquad (17)$$

By pre-multiplying the secant equation $s_m^T$ at both sides, the following curvature condition is obtained:

$$\underbrace{s_m^T B_{m+1} s_m}_{>0} = s_m^T c_m > 0. \qquad (18)$$

If the curvature condition is satisfied, $B_{m+1}$ in the secant equation has at least one solution, which can be updated by the following way:

$$B_{m+1} = B_m + \frac{c_m c_m^T}{c_m^T s_m} - \frac{B_m s_m s_m^T B_m}{s_m^T B_m s_m}. \qquad (19)$$

Its inverse, i.e., $H_{m+1}$, can be updated efficiently by Sherman-Morrison formula:

$$H_{m+1} = H_m - \frac{s_m c_m^T H_m + H_m c_m s_m^T}{s_m^T c_m} + \left(1 + \frac{c_m^T H_m c_m}{s_m^T c_m}\right) \frac{s_m s_m^T}{s_m^T c_m}, \qquad (20)$$

With these, the BFGS algorithm to solve Equation (7) is illustrated in Algorithm 1.

---

Algorithm 1 BFGS to optimize Eq. (7)

Input: Starting point $x_0$, convergence threshold $\epsilon$, initial inverse Hessian approximation $H_0$
Output: Optimal solution $x^*$
1: $m \leftarrow 0$
2: $g_m = \nabla f(x_m)$
3: while $\|g_m\| > \epsilon$ do
4:     Obtain a direction $p_m = -H_m g_m$
5:     Compute $x_{m+1} = x_m + \delta_m p_m$, where $\delta_m$ is chosen by line search to meet curvature condition
6:     $g_{m+1} = \nabla f(x_{m+1})$
7:     $s_m = x_{m+1} - x_m$
8:     $c_m = g_{m+1} - g_m$
9:     $H_{m+1} = H_m - \frac{s_m c_m^T H_m + H_m c_m s_m^T}{s_m^T c_m} + \left(1 + \frac{c_m^T H_m c_m}{s_m^T c_m}\right) \frac{s_m s_m^T}{s_m^T c_m}$
10:    $m \leftarrow m + 1$
11: end while
12: return $x_m$

---

Feature Selection by the USFS Framework 100

By solving all k sub-problems at time step t+1, the sparse coefficient matrix $W = [(w^{(t+1)})^1, \ldots, (w^{(t+1)})^k]$ is obtained. Since each sub-problem is solved separately, the number of non-zero weights in each $(w^{(t+1)})^i$ (i=1, . . . , k) is not necessarily to be the same. For each feature $f_i$, if any of the k corresponding feature weight coefficients $(w^{(t+1)})_j^i$ (i=1, 2, . . . , k) is nonzero, the feature is included in the final model, otherwise the feature is not selected. If $f_j$ is selected, its feature score at time step t+1 is defined as:

$$FScore(j)^{(t+1)} = \max((w^{(t+1)})_j^1, \ldots, (w^{(t+1)})_j^k) \qquad (21)$$

The selected features are then sorted according to their feature scores in a descending order, the higher the feature score, the more important the feature is.

The pseudo code of the unsupervised streaming feature selection framework 100 for social media data is illustrated in Algorithm 2. It efficiently performs unsupervised feature selection when a new feature $f_{t+1}$ arrives. In line 1, we obtain the social latent factor matrix Π using the link information M. The algorithm to check new feature and existing features is illustrated in lines 2-8. More specifically, for each subproblem, the gradient condition is first checked, this step decides whether the new feature (line 3) is accepted. If the condition is satisfied (line 4), the new feature is included in the model (line 5) and the model is re-optimized with respect to all existing feature weights (line 6). At last, when the new feature is included in the model, it updates the Laplacian matrix (line 10), calculates the feature scores, and updates the selected feature set (lines 11-12).

Time Complexity Analysis
Time Complexity for All Streaming Features

The mixed membership stochastic model to extract social latent factors has a time complexity of $O(n^2k^2)$. Assuming the total number of streaming features is t and the number of obtained features is s, the time complexity of updating

---

Algorithm 2 Unsupervised streaming
feature selection framework (USFS)

Input: New feature $f_{t+1}$ at time t + 1, feature weigth matrix $W^{(t)}$ at previous time step t, link information M, parameters α, β, γ, number of social latent factors k, number of nearest neighbors p
Output: Selected feature subset $S^{(t+1)}$ at time step t + 1
1:   Obtain social latent factors Π from M
2:   for each social latent factor $\pi^l$(l = 1,...,k) do
3:      compute gradient g for $f_{t+1}$ according to Eq. (8)
4:      if abs(g) > α then
5:         add feature $f_{t+1}$ to the model
6:         optimize the model via BFGS in Algorithm 1
7:      end if
8:   end for
9:   if feature $f_{t+1}$ is accepted then
10:     update Laplacian matrix $L^{(t+1)}$
11:     obtain feature scores according to Eq. (21)
12:     sort features by scores and update $S^{(t+1)}$
13:  end if
14:  return $S^{(t+1)}$

---

Laplacian matrix is bounded by $O(n^2st)$. At each time step, the gradient condition in Equation (13) is checked. The time complexity upper bound of the gradient checking over all t time steps is $O(n^2kst)$. Since the model in Eq. (7) is optimized when the new feature is accepted, the total time of optimization with BFGS is $O(n^2s^2t)$ in the worst case when the selected s features are the latest arrived s features.

Overall, the total time complexity of the USFS framework 100 is $O(n^2k^2)+O(n^2st)+O(n^2kst)+O(n^2s^2t)$. Since k<<t and s<<t, the upper bound of the overall time complexity is $O(n^2s^2t)$. However, it only provides an upper bound, in real-world applications, the time complexity could be much lower than this upper bound. The efficiency of the USFS framework 100 will be empirically shown in the experiments.

Time Complexity for an Individual Feature

For the newly generated feature, suppose there are already s features in the model, if its previous feature is added in the model, the time complexity of gradient test is $O(n^2ks)$, otherwise the time complexity is only $O(n)$. To test existing features via BFGS, the time complexity is $O(n^2s^2)$.

EXPERIMENTS

In this section, experiments were conducted to evaluate the performance of the USFS framework 100. In particular, the following questions were addressed: 1) how is the quality of selected features by USFS framework 100 compared with the state-of-the-art unsupervised feature selection algorithms? 2) how efficient is the USFS framework 100? Before introducing the details of experiments, the datasets and experimental settings were first introduced.

Datasets

Two real-world social media datasets BlogCatalog and Flickr were used for experimental evaluation. Some statistics of the datasets are listed in Table 1.

TABLE 1

Detailed information of datasets.

|  | BlogCatalog | Flickr |
|---|---|---|
| # of Users | 5,196 | 7,575 |
| # of Features | 8,189 | 12,047 |
| # of Links | 171,743 | 239,738 |
| # of Ave Degree | 66.11 | 63.30 |
| # of Classes | 0 | 0 |

BlogCatalog: BlogCatalog is a social blog directory which manages bloggers and their blogs. Bloggers are associated with sets of tags, which provide feature information. Users in blogcatalog follow each other which form the social link information. Bloggers can also register their blogs under predefined categories, which are used as ground truth for validation in our work.

Flickr: Flickr is an image hosting and sharing website, the key features in Flickr are tags, user can specify the list of tags to reflect their interests. Similar to blogcatalog, users in Flickr can interact with others. Photos are organized under prespecified categories, which are used as the ground truth.

Experimental Settings

Following a standard way to assess unsupervised feature selection, the clustering performance is used to evaluate the quality of selected features. Two commonly used clustering performance evaluation metrics, i.e., accuracy (ACC) and normalized mutual information (NMI) are used in this paper.

To the best of our knowledge, this is study streaming feature selection in social media. To investigate the effectiveness and the efficiency of the USFS framework 100, the following state-of-the-art unsupervised feature selection algorithms were selected as baseline methods:

LapScore: Laplacian score evaluates feature importance by its ability to preserve the local manifold structure of data.

SPEC: Features are selected by spectral analysis [and SPEC can be considered as an extension of Laplacian score method.

NDFS: Nonnegative Discriminative Unsupervised Feature Selection which selects features via a joint nonnegative spectral analysis as well as $l_{2,1-norm}$ regularization.

LUFS: LUFS utilizes both content information and link information to perform feature selection in an unsupervised scenario.

For LapScore, NDFS and USFS, a previous work was used to specify the number of neighborhood size to be 5 to construct the Laplacian matrix on the data instances. NDFS and LUFS have different regularization parameters and so these regularization parameters were set according to the suggestions from previous studies. For the USFS framework 100, the number of social latent factors was set as the number of clusters. There are three important regularization parameters α, β and γ in USFS framework 100 α controls the sparsity of the model, β is the parameter for elastic net which controls the robustness of the model, and γ balances the contribution of the link information and feature information. In the experiments, α=10, β=0.1, γ=0.1 was empirically set and more details about the effects of these parameters on the USFS framework 100 will be discussed herein.

All experiments are conducted on a machine with 16 GB RAM and Intel Core i7-4770 CPU.

Quality of Selected Features

Following streaming feature selection settings that assume features arrive one at a time, all features were divided into 9 groups where the first {20%, ..., 90%, 100%} were chosen as streaming features. In each group, feature selection was performed with traditional unsupervised feature selection algorithm as well as the USFS framework 100. How many features the USFS framework 100 selects are recorded and the same number is specified as that of selected features by traditional unsupervised feature selection algorithms for a fair comparison.

After obtaining the feature selection results, K-means clustering is performed based on the chosen features. The K-means algorithm is repeated 20 times and report average results because K-means may converge to local minima. The clustering results are evaluated by both accuracy (ACC) and normalized mutual information (NMI). The higher the ACC and NMI values are, the better feature selection performance is. The comparison results are shown in Table 2 and Table 3 for BlogCatalog and Flickr, respectively. Note that the number in parentheses in the table indicates the number of selected features determined by USFS framework 100. The following observations were made:

USFS framework 100 tends to accept new features at the very beginning, then it becomes increasingly difficult for newly generated features to alternate previous decisions since existing features already provide us enough information. For example, no new features are accepted anymore after the number of selected features reaches 275 and 670 in BlogCatalog and Flickr, respectively.

USFS framework 100 consistently outperforms all baseline methods on both datasets with significant performance gain in most cases. The reason is that traditional unsupervised feature selection algorithms are based on the i.i.d. assumption which is invalid in linked social media data. The USFS framework 100 takes advantage of link information to guide the unsupervised streaming feature selection. It can also be observed that when feature information is scarce (for example 20%), link information could better complement feature information for feature selection. A pair-wise wilcoxon signed-rank test was also performed between the USFS framework 100 and other baseline methods on different proportions of streaming features and the test results show that the USFS framework 100 is significantly better (with both 0.01 and 0.05 significance level).

For baseline methods, clustering performance gradually decreases when features are continuously generated. While for USFS framework 100, the clustering performance is relatively more stable when the proportion of streaming features varies from 20% to 100%. The number of selected features by the USFS framework 100 is also very stable, which varies from 236 to 275 in BlogCatalog and 562 to 670 in Flickr, respectively. It demonstrates the effectiveness of streaming feature selection, with a large amount of streaming features, a small set of relevant features can only be dynamically maintained without deteriorating the performance.

Efficiency Performance Comparison

Figure 3A:
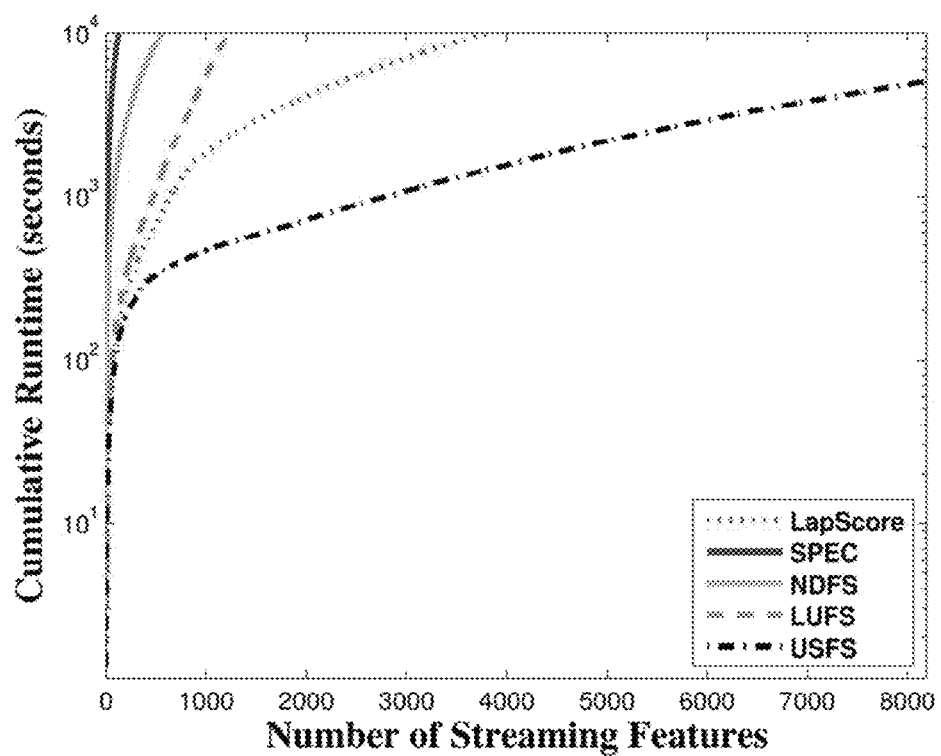
Figure 3B:
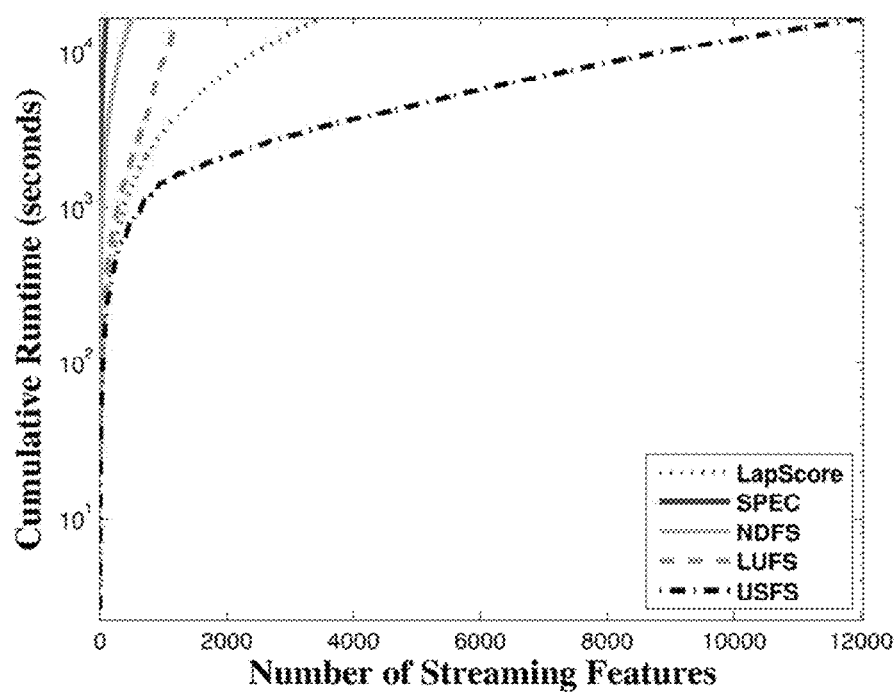
FIG. 3B is a graph showing a cumulative runtime on Flickr dataset.

To evaluate the efficiency of the USFS framework 100, the running times of different methods are compared in graphs 200 and 202 shown in FIGS. 3A-3B. As LapScore, SPEC, NDFS and LUFS are not designed for dealing with streaming features, the feature selection process is rerun at each time step. For both datasets, we set the cumulative running time threshold to be around $10^4$ seconds since all methods except USFS take more than 50 hours. As can be observed, the USFS framework 100 is perform significantly faster than other baseline methods, the average processing time for each feature in BlogCatalog and Flickr is only 0.62 seconds and 1.37 seconds, respectively.

The cumulative running time of the USFS framework 100 was also recorded when the cumulative running time of other methods arrived at the threshold ($10^4$ seconds). The results show that in BlogCatalog, the USFS framework 100 is 7×, 20×, 29×, 76× faster than LapScore, LUFS, NDFS, SPEC, respectively; in Flickr, the USFS framework 100 is 5×, 11×, 20×, 75× faster than LapScore, LUFS, NDFS, and SPEC, respectively. The difference is becoming larger as the curve of the USFS framework 100 shown in FIGS. 3A and 3B are getting smoother when streaming features continuously arrive.

Effects of Parameters

As discussed herein, the USFS framework 100 has four important parameters: the number of social latent factors k, and parameters α, β and γ in Equation (6). To investigate the effects of these parameters, we vary one parameter each time and fix the other three to see how the parameter affects the feature selection performance in terms of clustering with different number of selected features. The parameter study was performed only on BlogCatalog dataset to save space since similar observations were made with the Flickr dataset.

Figure 4A:
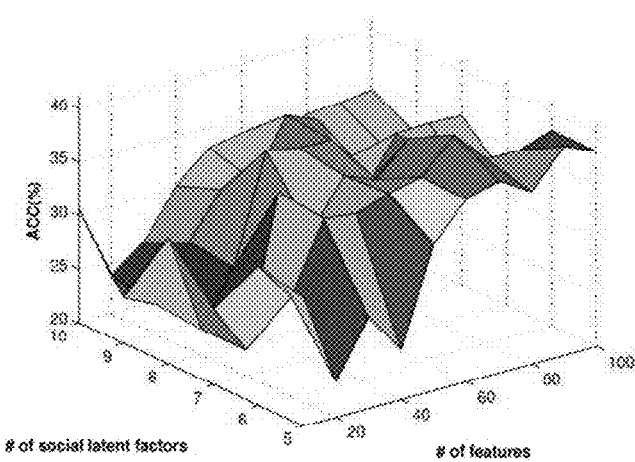
FIGS. 4A and 4B are graphs showing the effect of # social latent factors.
Figure 4B:
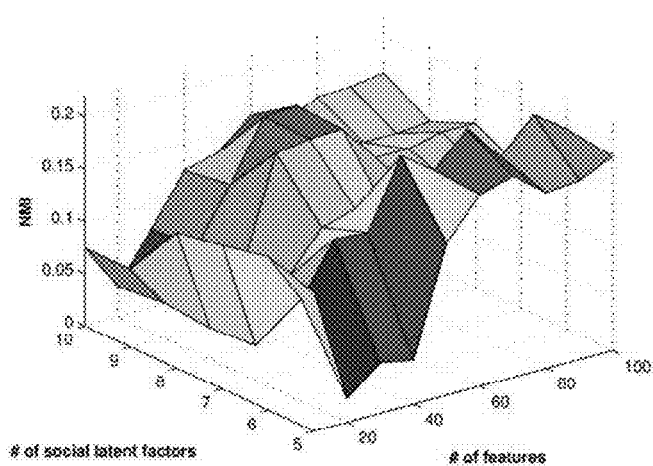

First, the number of social latent factors k was varied from 5 to 10 while fix the other three parameters (α=10, β=0.1, γ=0.1). The clustering performance in terms of Accuracy and NMI is illustrated in graphs 204 and 206 shown in FIGS. 4A and 4B. The clustering performance is the best when the number of social latent factors is close to the number of clusters, which is 6 in BlogCatalog.

Figure 5A:
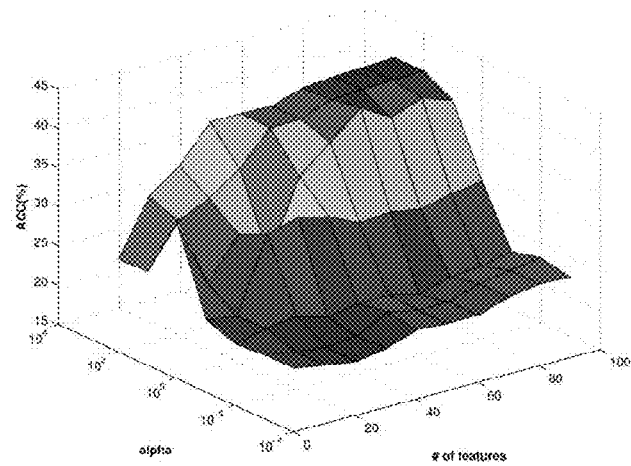
FIGS. 5A and 5B are graphs showing the effect of $\alpha$.
Figure 5B:
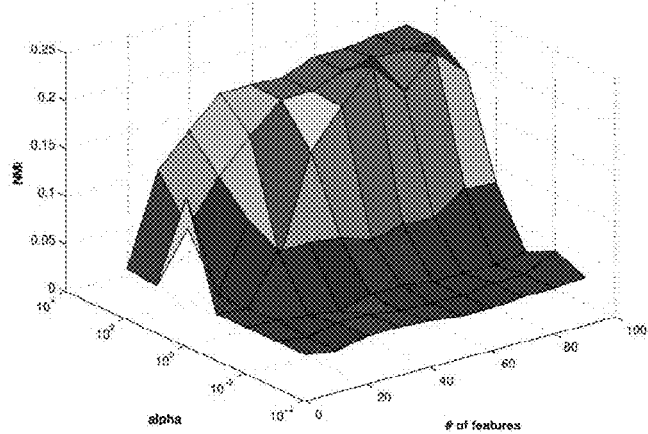

To assess the effect of parameter α which controls the model sparseness, we vary α as {0.001, 0.01, 0.1, 1, 10, 100, 1000} while fix k=6, β=0.1, γ=0.1, performance variance between α and number of selected features is presented in graphs 208 and 210 shown in FIGS. 5A and 5B. With the increase of α, the clustering performance rises rapidly and then keeps stable between the range of 10 to 1000. A high value of α indicates that it is not easy for new features to pass the gradient test in Equation (13), thus the accepted features are more relevant and meaningful.

Figure 6A:
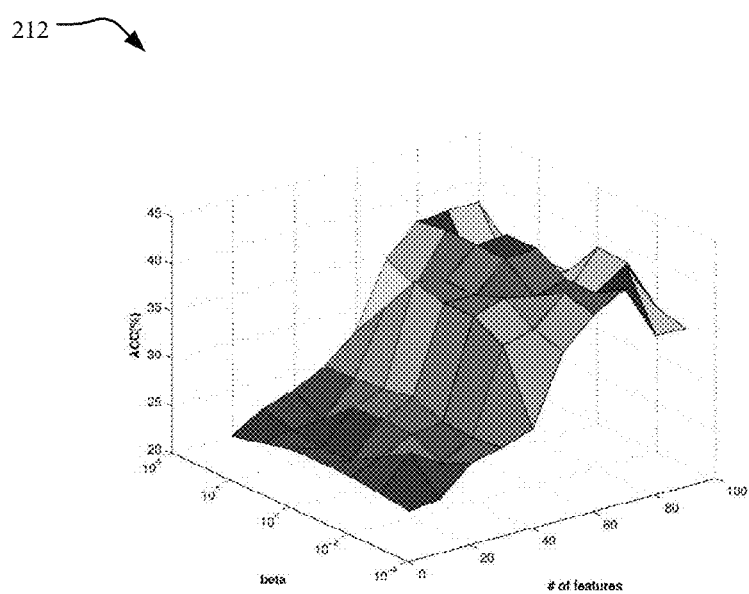
FIGS. 6A and 6B are graphs showing the effect of $\beta$.
Figure 6B:
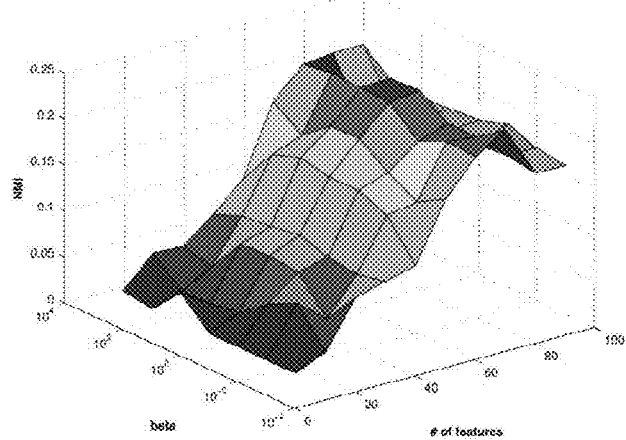

The effect of parameter β was studied which makes the model more robust. Similar to the setting of α, β is also in the range of {0.001, 0.01, 0.1, 1, 10, 100, 1000} and k=6, α=10, γ=0.1. The results are shown in graphs 212 and 214 shown in FIGS. 6A and 6B. It is shown that clustering performance is much more sensitive to the number of selected features than to β. The performance is relatively higher when β is between 0.1 and 10.

Figure 7A:
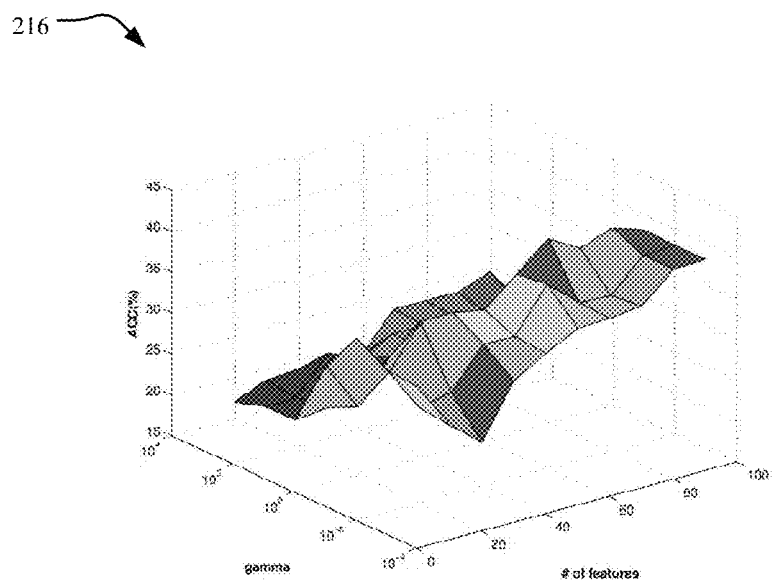
FIGS. 7A and 7B are graphs showing the effect of $\gamma$.
Figure 7B:
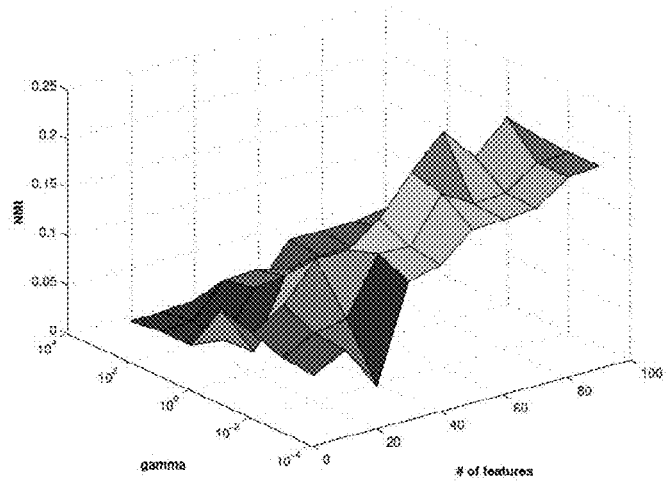

In addition, the trade-off between link information and feature information was evaluated by varying γ in {0.001, 0.01, 0.1, 1, 10, 100, 1000} while fix k=6, α=10, β=0.1. The results are presented in graphs 216 and 218 shown in FIGS. 7A and 7B. As shown in the figure, in most cases, the clustering performance first increases, reaches its peak and then it gradually decreases. The best performance was achieved when γ is around 0.1. These observations suggest the importance of both link information and feature information in unsupervised streaming feature selection.

TABLE 2

Clustering results with different feature selection algorithms on BlogCatalog dataset.

|  | 20%(259) | 30%(260) | 40%(270) | 50%(271) | 60%(272) | 70%(272) | 80%(274) | 90%(275) | 100%(276) |
|---|---|---|---|---|---|---|---|---|---|
| Accuracy | | | | | | | | | |
| LapScore | 87.96 | 28.60 | 22.88 | 23.00 | 23.36 | 26.98 | 26.33 | 26.73 | 26.00 |
| SPEC | 30.10 | 29.50 | 24.79 | 21.48 | 18.88 | 10.63 | 18.34 | 18.30 | 18.01 |
| NDFS | 30.89 | 25.37 | 28.07 | 26.44 | 25.42 | 26.00 | 23.69 | 23.85 | 23.78 |
| LUFS | 24.65 | 24.11 | 22.27 | 22.84 | 22.50 | 20.71 | 21.61 | 20.71 | 20.48 |
| USFS | 40.65 | 39.61 | 40.57 | 40.61 | 40.67 | 40.67 | 40.78 | 40.84 | 40.84 |
| NMI | | | | | | | | | |
| LapScore | 0.1451 | 0.0600 | 0.0474 | 0.0610 | 0.0507 | 0.0743 | 0.0675 | 0.0793 | 0.0682 |
| SPEC | 0.0606 | 0.0765 | 0.0397 | 0.0143 | 0.0951 | 0.0098 | 0.0032 | 0.0029 | 0.0019 |
| NDFS | 0.1475 | 0.1250 | 0.1193 | 0.1092 | 0.1284 | 0.1006 | 0.1125 | 0.1130 | 0.1160 |
| LUFS | 0.0574 | 0.0033 | 0.0488 | 0.0490 | 0.0462 | 0.0492 | 0.0462 | 0.0345 | 0.0287 |
| USFS | 0.2028 | 0.1861 | 0.2828 | 0.2026 | 0.2042 | 0.2042 | 0.2059 | 0.2072 | 0.2072 |

TABLE 3

Clustering results with different feature selection algorithms on Flickr dataset.

|  | 20%(640) | 30%(666) | 40%(670) | 50%(670) | 60%(670) | 70%(670) | 80%(670) | 90%(670) | 100%(670) |
|---|---|---|---|---|---|---|---|---|---|
| Accuracy | | | | | | | | | |
| LapScore | 25.06 | 19.30 | 21.27 | 17.52 | 15.27 | 13.58 | 13.53 | 12.73 | 12.07 |
| SPEC | 25.52 | 20.26 | 17.50 | 15.46 | 13.53 | 14.11 | 13.94 | 13.53 | 13.07 |
| NDFS | 22.30 | 29.50 | 26.79 | 25.29 | 25.64 | 28.01 | 25.97 | 29.08 | 20.48 |
| LUFS | 27.13 | 22.11 | 19.19 | 24.00 | 24.79 | 19.97 | 16.22 | 19.24 | 23.99 |
| USFS | 27.22 | 29.50 | 28.37 | 28.37 | 28.37 | 28.37 | 28.37 | 28.37 | 28.37 |
| NMI | | | | | | | | | |
| LapScore | 0.1072 | 0.0629 | 0.0786 | 0.0521 | 0.0308 | 0.0143 | 0.0172 | 0.0100 | 0.0040 |
| SPEC | 0.0854 | 0.0546 | 0.0326 | 0.0246 | 0.0117 | 0.0152 | 0.0118 | 0.0109 | 0.0083 |
| NDFS | 0.0876 | 0.1260 | 0.1073 | 0.0876 | 0.0853 | 0.1207 | 0.1236 | 0.1152 | 0.0663 |
| LUFS | 0.1129 | 0.0958 | 0.0550 | 0.1015 | 0.1023 | 0.0602 | 0.0535 | 0.0524 | 0.0913 |
| USFS | 0.1285 | 0.1368 | 0.1262 | 0.1262 | 0.1262 | 0.1262 | 0.1262 | 0.1262 | 0.1262 |

Figure 8:
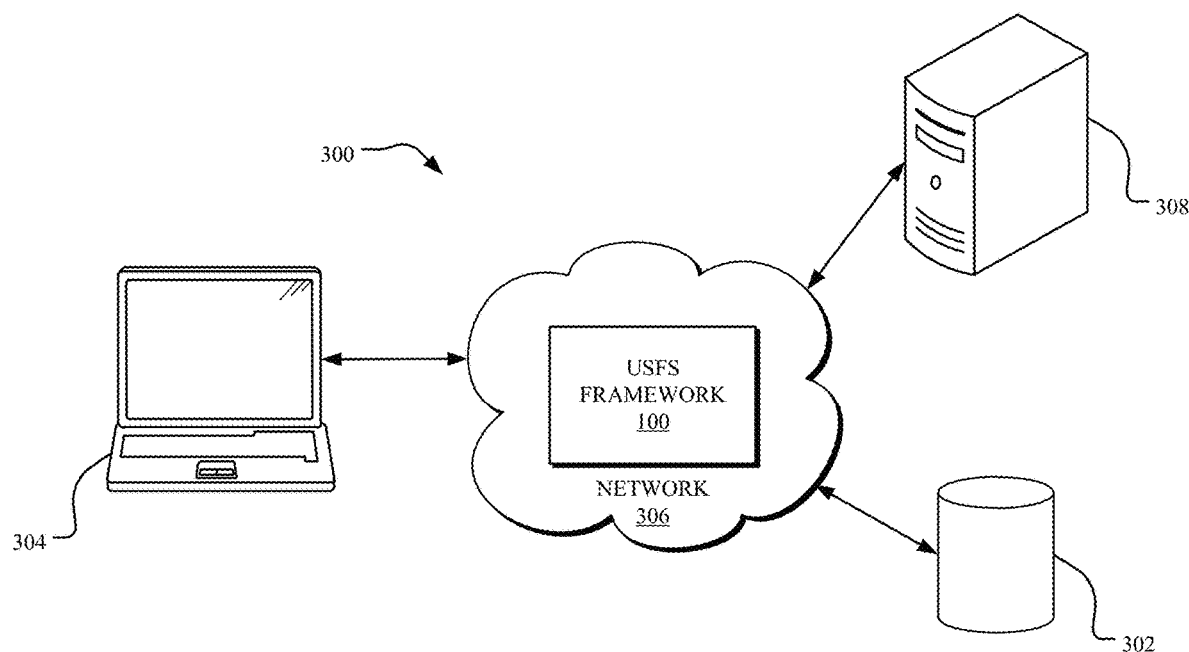
FIG. 8 depicts an example network environment that may implement various systems and methods of the presently disclosed technology.

FIG. 8 illustrates an example network environment 300 for implementing the various systems and methods, as described herein. As depicted in FIG. 8, a communications network 302 (e.g., the Internet) is used by one or more computing or data storage devices for implementing the systems and methods for managing high-dimensional data using the framework 100. In one implementation, one or more databases 302, such as a storage cluster, one or more computing devices 304, and/or other network components or computing devices described herein are communicatively connected to the communications network 302. Examples of the computing devices 304 include a terminal, personal computer, a mobile device, a smart-phone, a tablet, a multimedia console, a gaming console, a set top box, etc.

A server 306 hosts the system. In one implementation, the server 306 also hosts a website or an application that users may visit to access the high-dimensional data and/or the framework 100. The server 306 may be one single server, a plurality of servers 306 with each such server 306 being a physical server or a virtual machine, or a collection of both physical servers and virtual machines. In another implementation, a cloud hosts one or more components of the system. The computing devices 304, the server 306, and other resources connected to the communications network 302 may access one or more additional servers for access to one or more websites, applications, web services interfaces, etc. that are used for data management. In one implementation, the server 306 also hosts a search engine that the system uses for accessing and modifying information, including without limitation, high-dimensional data and/or algorithms of the framework 100.

Figure 9:
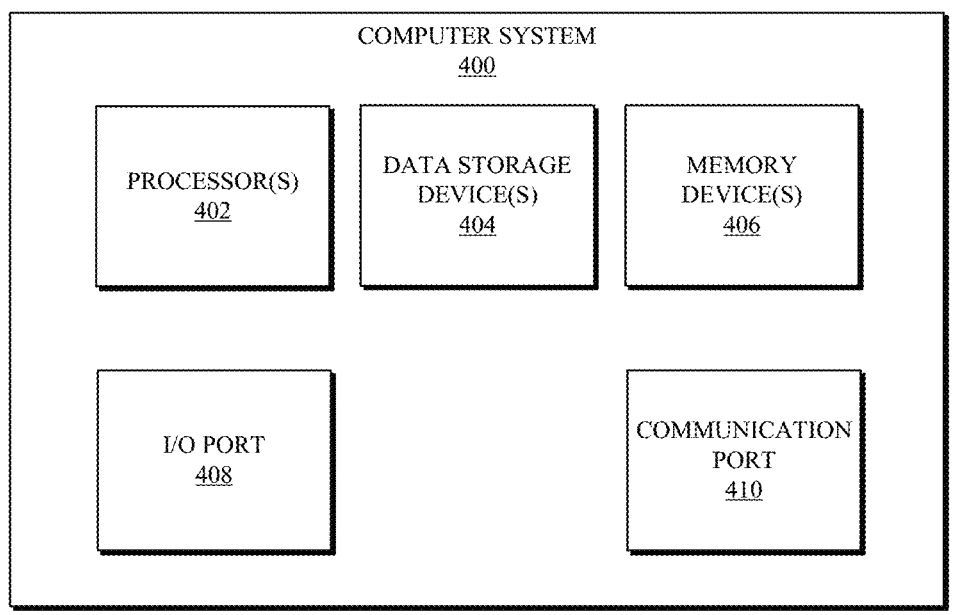
FIG. 9 shows an example computing system that may implement various systems and methods of the presently disclosed technology.

Referring to FIG. 9, a detailed description of an example computing system 400 having one or more computing units that may implement various systems and methods discussed herein is provided. The computing system 400 may be applicable to the computing device 304, the server 306, and other computing or network devices. It will be appreciated that specific implementations of these devices may be of differing possible specific computing architectures not all of which are specifically discussed herein but will be understood by those of ordinary skill in the art.

The computer system 400 may be a computing system is capable of executing a computer program product to execute a computer process. Data and program files may be input to the computer system 400, which reads the files and executes the programs therein. Some of the elements of the computer system 400 are shown in FIG. 9, including one or more hardware processors 402, one or more data storage devices 404, one or more memory devices 408, and/or one or more ports 408-410. Additionally, other elements that will be recognized by those skilled in the art may be included in the computing system 400 but are not explicitly depicted in FIG. 9 or discussed further herein. Various elements of the computer system 400 may communicate with one another by way of one or more communication buses, point-to-point communication paths, or other communication means not explicitly depicted in FIG. 9.

The processor 402 may include, for example, a central processing unit (CPU), a microprocessor, a microcontroller, a digital signal processor (DSP), and/or one or more internal levels of cache. There may be one or more processors 402, such that the processor 402 comprises a single central-processing unit, or a plurality of processing units capable of executing instructions and performing operations in parallel with each other, commonly referred to as a parallel processing environment.

The computer system 400 may be a conventional computer, a distributed computer, or any other type of computer, such as one or more external computers made available via a cloud computing architecture. The presently described technology is optionally implemented in software stored on the data stored device(s) 404, stored on the memory device(s) 406, and/or communicated via one or more of the ports 408-410, thereby transforming the computer system 400 in FIG. 9 to a special purpose machine for implementing the operations described herein. Examples of the computer system 400 include personal computers, terminals, workstations, mobile phones, tablets, laptops, personal computers, multimedia consoles, gaming consoles, set top boxes, and the like.

The one or more data storage devices 404 may include any non-volatile data storage device capable of storing data generated or employed within the computing system 400, such as computer executable instructions for performing a computer process, which may include instructions of both application programs and an operating system (OS) that manages the various components of the computing system 400. The data storage devices 404 may include, without limitation, magnetic disk drives, optical disk drives, solid state drives (SSDs), flash drives, and the like. The data storage devices 404 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 406 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 404 and/or the memory devices 406, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 400 includes one or more ports, such as an input/output (I/O) port 408 and a communication port 410, for communicating with other computing, network, or vehicle devices. It will be appreciated that the ports 408-410 may be combined or separate and that more or fewer ports may be included in the computer system 400.

The I/O port 408 may be connected to an I/O device, or other device, by which information is input to or output from the computing system 400. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 400 via the I/O port 408. Similarly, the output devices may convert electrical signals received from computing system 400 via the I/O port 408 into signals that may be sensed as output by a human, such as sound, light, and/or touch. The input device may be an alphanumeric input device, including alphanumeric and other keys for communicating information and/or command selections to the processor 402 via the I/O port 408. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 400 via the I/O port 408. For example, an electrical signal generated within the computing system 400 may be converted to another type of signal, and/or vice-versa. In one implementation, the environment transducer devices sense characteristics or aspects of an environment local to or remote from the computing device 400, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 400, such as, physical movement of some object (e.g., a mechanical actuator), heating or cooling of a substance, adding a chemical substance, and/or the like.

In one implementation, a communication port 410 is connected to a network by way of which the computer system 400 may receive network data useful in executing the methods and systems set out herein as well as transmitting information and network configuration changes determined thereby. Stated differently, the communication port 410 connects the computer system 400 to one or more communication interface devices configured to transmit and/or receive information between the computing system 400 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 410 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 410 may communicate with an antenna or other link for electromagnetic signal transmission and/or reception.

In an example implementation, the framework 100 algorithms, and other software and/or modules and services may be embodied by instructions stored on the data storage devices 404 and/or the memory devices 406 and executed by the processor 402.

The system set forth in FIG. 9 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for managing high-dimensional data in streaming social media, the method comprising:
generating, by a processor, a model for unsupervised streaming feature selection from high-dimensional data defining a set of linked data instances, by:
modeling link information associated with the set of linked data instances via extracting social latent factors, by, for each of the set of linked data instances, assigning a k-dimensional social latent vector at a time step t of a plurality of time steps, and
modeling feature information of the high-dimensional data by generating a data matrix for the high-dimensional data, the data matrix representing similarities in features between different ones of the set of data instances, wherein the feature information is modeled to be consistent with the social latent factors, each of the set of features dynamically generated and arriving at the time step t from a social media stream; and
selecting, by the processor and utilizing both of the feature information and the link information of the model, a subset of features at each of the plurality of time steps to facilitate clustering including, including utilizing the social latent factors as a constraint to perform feature selection through a regression model as the social latent factors are extracted for each of the set of linked data instances.

2. The method of claim 1, wherein the social latent factors are extracted based on a mixed membership stochastic blockmodel.

3. The method of claim 1, wherein each of the plurality of data instances is associated with a latent factor vector, the latent factor vectors of the plurality of data instances interacting with each other to form one or more social relationships.

4. The method of claim 3, wherein the social latent factors are extracted from the one or more social relationships using a scalable interference algorithm.

5. The method of claim 1, wherein the social latent factors are extracted using a scalable interference algorithm.

6. The method of claim 1, wherein the link information is a directed graph or an undirected graph.

7. The method of claim 1, wherein a subset of the most relevant features is identified at the time step given each social latent factor for the plurality of data instances.

8. The method of claim 1, wherein selecting one or more relevant features in the social media stream from the one or more features through a regression model includes modeling feature information based on feature similarity between the plurality of data instances.

9. The method of claim 1, further comprising:
identifying a new feature.

10. The method of claim 9, wherein identifying the new feature includes determining whether to select the new feature from the one or more relevant features.

11. The method of claim 1, further comprising:
determining whether to discard one or more existing features.

* * * * *